(12) United States Patent
Sun et al.

(10) Patent No.: US 9,753,652 B2
(45) Date of Patent: Sep. 5, 2017

(54) MEMORY CONTROLLER, DATA STORAGE DEVICE, AND MEMORY CONTROL METHOD

(71) Applicant: CHUO UNIVERSITY, Hachioji-shi, Tokyo (JP)

(72) Inventors: Chao Sun, Tokyo (JP); Kosuke Miyaji, Tokyo (JP); Ken Takeuchi, Tokyo (JP)

(73) Assignee: CHUO UNIVERSITY, Hachioji-shi, Tokyo (JP)

( * ) Notice: Subject to any disclaimer, the term of this patent is extended or adjusted under 35 U.S.C. 154(b) by 267 days.

(21) Appl. No.: 14/429,049

(22) PCT Filed: Aug. 20, 2013

(86) PCT No.: PCT/JP2013/004923
§ 371 (c)(1),
(2) Date: Mar. 18, 2015

(87) PCT Pub. No.: WO2014/045516
PCT Pub. Date: Mar. 27, 2014

(65) Prior Publication Data
US 2015/0220273 A1    Aug. 6, 2015

(30) Foreign Application Priority Data

Sep. 19, 2012    (JP) .................................. 2012-205664

(51) Int. Cl.
*G06F 3/06*       (2006.01)
*G06F 12/02*     (2006.01)

(52) U.S. Cl.
CPC .......... *G06F 3/0611* (2013.01); *G06F 3/0616* (2013.01); *G06F 3/0659* (2013.01);
(Continued)

(58) Field of Classification Search
CPC .... G06F 3/0611; G06F 3/0616; G06F 3/0679; G06F 3/0659; G06F 12/0238;
(Continued)

(56) References Cited

U.S. PATENT DOCUMENTS

| 6,836,432 B1 * | 12/2004 | Parker ................. G11C 11/5628 365/185.03 |
| 2009/0024787 A1 * | 1/2009 | Yim .................... G06F 12/0246 711/103 |

(Continued)

FOREIGN PATENT DOCUMENTS

| JP | 2006-018591 A | 1/2006 |
| JP | 2008-134685 A | 6/2008 |
| KR | 20090109959 | 10/2009 |
| WO | 2008018258 A | 2/2008 |

OTHER PUBLICATIONS

Jun. 7, 2016, Office Action issued by the Korean Intellectual Property Office in the corresponding Korean Patent Application No. 10-2015-7006958.

(Continued)

*Primary Examiner* — Zhuo Li
(74) *Attorney, Agent, or Firm* — Kenja IP Law PC (57) ABSTRACT

To reduce deterioration of non-volatile memory and write data at higher speed, writing data is stored in a ReRAM when a page utilization rate R is lower than a threshold Rth1 and/or the writing data is frequently-rewritten data. With an empty space Semp2 in the ReRAM being less than a threshold Sth (step S110), when the data in the ReRAM is infrequently-rewritten data and the page utilization rate R obtained if target data is stored in a flash memory 22 is equal to or higher than a threshold value Rth3 (steps S120 and S130), data of logical sectors contained in N logical page addresses stored in a transfer list is read from the ReRAM to be written to the flash memory (steps S140 to S160). These steps reduce deterioration of the flash memory and allow higher data writing.

11 Claims, 5 Drawing Sheets

(52) U.S. Cl.
CPC ........ *G06F 3/0679* (2013.01); *G06F 12/0238* (2013.01); *G06F 12/0246* (2013.01); *G06F 2212/1016* (2013.01); *G06F 2212/1036* (2013.01); *G06F 2212/7202* (2013.01); *G06F 2212/7203* (2013.01); *Y02B 60/1225* (2013.01)

(58) Field of Classification Search
CPC ......... G06F 12/0246; G06F 2212/7202; G06F 2212/1036; G06F 2212/1016; G06F 2212/7203; Y02B 60/1225
See application file for complete search history.

(56) References Cited

U.S. PATENT DOCUMENTS

2010/0312953 A1* 12/2010 Allen .................. G06F 12/0246
711/103
2011/0252187 A1* 10/2011 Segal .................. G06F 12/0246
711/103

OTHER PUBLICATIONS

Nov. 19, 2013 International Search Report issued in International Patent Application No. PCT/JP2013/004923.
Daisaburo Takashima et al., A "128Mb ChainFeRAMTM and System Designs for HDD Application and Enhanced HDD Performance", IEEE Asian Solid-State Circuits Conference, Nov. 16-18, 2009, Taipei, Taiwan.

* cited by examiner

USFT STORED | 0 | 1 | 1 | 1 | 1 | 1 | 1 | 1 |

WSFT | 1 | 1 | 0 | 0 | 0 | 0 | 0 | 0 |

USFT CREATED | 1 | 1 | 1 | 1 | 1 | 1 | 1 | 1 |

USFT STORED | 0 | 0 | 0 | 0 | 0 | 0 | 0 | 0 |

WSFT | 1 | 1 | 0 | 0 | 0 | 0 | 0 | 0 |

USFT CREATED | 1 | 1 | 0 | 0 | 0 | 0 | 0 | 0 |

R=2/8=0.25

MEMORY CONTROLLER, DATA STORAGE DEVICE, AND MEMORY CONTROL METHOD

CROSS-REFERENCE TO RELATED APPLICATIONS

This application claims priority of Japanese Patent Application No. 2012-205664 filed on Sep. 19, 2012, the disclosure of which is incorporated by reference herein in its entirety.

TECHNICAL FIELD

This disclosure relates to a memory controller, a data storage device, and a memory control method, and more specially, to a memory controller that controls a first memory and a second memory, a data storage device including such a memory controller, and a memory control method for controlling the first and second memories. The first memory is configured as a non-volatile memory to which data is written by writing operation in which data is read on a page basis consisting of a plurality of sectors, a sector corresponding to writing data among the data being read is overwritten by the writing data, and then data is written on the page basis. The second memory is configured as a non-volatile random access memory that allows faster data writing than the first memory.

BACKGROUND

The memory controller of this type conventionally proposed controls a ferroelectric random access memory (FeRAM), which is a non-volatile random access memory that retains its storing data even when the power is turned off and works as a cache memory, and a hard disk drive (HDD) such that data from personal computer systems can be stored in the FeRAM and HDD (see for example Non-Patent Literature 1, "A 128 Mb ChainFeRAMTM and System Designs for HDD Application and Enhanced HDD Performance", by Daisaburo Takashima et al.). This type of controller has eliminated the need to periodically save the data stored in a FeRAM to an HDD in preparation for unexpected power shutdown, and thus increased the amount of data to be stored in the FeRAM and improved the cache hit ratio.

CITATION LIST

Non-Patent Literature

NPL 1: Daisaburo Takashima et al, A "128 Mb Chain-FeRAMTM and System Designs for HDD Application and Enhanced HDD Performance", IEEE Asian Solid-State Circuits Conference, Nov. 16-18, 2009, Taipei, Taiwan

SUMMARY

A solid state drive (SSD) for storing data from host devices that has been developed includes a non-volatile memory, such as a NAND flash memory to which data is written by writing operation, in which data stored on a page basis consisting of a plurality of sectors is first read, the data being read is written on a sector basis, and then data is written on the page basis; a non-volatile random access memory, such as resistance random access memory (ReRAM) that allows faster data reading/writing than the non-volatile memory; and a memory controller that controls the non-volatile memory and the non-volatile random access memory. In such SSDs, repeated writing-operation to the non-volatile memory may result in deterioration of the non-volatile memory, and thus reduction of deterioration in the non-volatile memory has been a critical issue. Furthermore, in such SSDs data writing at higher speed is also a critical need. It is therefore desirable in SSDs to achieve faster data writing while reducing the deterioration of non-volatile memory.

Our memory controller, data storage device, and memory control method are primarily intended to achieve faster data writing and reduced deterioration in a non-volatile memory.

The memory controller, the data storage device, and the memory control method use the following means to achieve the above-mentioned primary object.

The memory controller is for controlling a first memory and a second memory, wherein the first memory is configured as a non-volatile memory to which data is written by writing operation in which data is read on a page basis consisting of a plurality of sectors, a sector corresponding to writing data among the data being read is overwritten by the writing data, and then data is written on the page basis, and the second memory is configured as a non-volatile random access memory that allows faster data writing than the first memory.

The memory controller includes a writing controller and a data transfer controller. The writing controller is configured to control the first and second memories, upon input of the writing data and a writing request signal requesting writing of the writing data, such that the writing data being input is written to the first memory by the writing operation when a data utilization rate obtained if the writing data is written to the first memory is equal to or higher than a first rate, wherein the data utilization rate indicates a rate of a sector size used for storing the writing data based on a storage area having a predetermined size; and such that the writing data being input is stored in the second memory when the data utilization rate is lower than the first rate.

The data transfer controller is configured to execute data transfer control that controls the first and second memories, with an empty space in the second memory being less than a predetermined amount, such that, at least on a necessary condition that the data stored in the second memory is infrequently-rewritten data with a low rewritten frequency, the infrequently-rewritten data is read from the second memory to be written to the first memory by the writing operation.

The memory controller controls the first and second memories, upon input of the writing data and the writing request signal requesting the writing of the writing data, such that the writing data being input is written to the first memory by the writing operation when the data utilization rate obtained if the writing data is written to the first memory is equal to or higher than the first rate, wherein the data utilization rate indicates the rate of the sector size used for storing the writing data based on the storage area having the predetermined size, and such that the data writing data being input is stored in the second memory when the data utilization rate is lower than the first rate. In the data writing operation to the first memory, data is read on the page basis consisting of a plurality of sectors, a sector corresponding to the writing data among the data being read is overwritten by the writing data, and then data is written on the page basis. Accordingly, in the writing operation to the first memory, reading and writing are performed also on sectors that are not used for data storage. Non-volatile memories are deteriorated by execution of writing operation. It is thus desired that writing be not performed on such sectors not being used for data storage. To achieve this, the first and second memories are controlled such that the writing data being input is stored in the second memory when the data utilization rate is lower than the first rate. This allows the data utilization rate in the first memory to be equal to or higher than the first rate, and thus reading/writing from/to the storage area in the first memory not being used for data storage is reduced. In this manner, deterioration of the first memory can be reduced. With the data being written to the second memory as above, the empty space in the second memory is reduced. Since the second memory allows faster data writing than the first memory, such a less empty space in the second memory, which may eventually inhibit writing to the second memory, reduces data writing speed. Moreover, if the second memory contains large amounts of infrequently-rewritten data, which is data with a low rewritten frequency, the data writing speed will further be reduced. To avoid this, the second and first memories are controlled, with the empty space in the second memory being less than the predetermined amount, such that when the data stored in the second memory is the infrequently-rewritten data with a low rewritten frequency, the infrequently-rewritten data is read from the second memory to be written to the first memory by the writing operation. This prevents the empty space in the second memory from being reduced to less than the predetermined amount, thus allowing faster data writing. In this manner, deterioration of the non-volatile memory can be reduced and faster data writing is achieved. In this regard, the "predetermined size" refers, for example, to a size determined in advance as a page size, a size of multiple pages, or a size larger than the size of one sector in the page corresponding to the logical address of the writing data. The "first memory" includes a NAND flash memory, and the "second memory" includes a resistance random access memory.

In the memory controller, the data transfer controller may be configured to execute the data transfer control, with the empty space in the second memory being less than the predetermined amount, at least on necessary conditions that the data stored in the second memory is the infrequently-rewritten data and the data utilization rate obtained if the infrequently-rewritten data is written to the first memory is equal to or higher than a second rate, the second rate being lower than the first rate. This prevents the data that renders the data utilization rate to be lower than the second rate from being stored in the first memory, which reduces deterioration of the first memory.

The memory controller, which executes the data transfer control when the data utilization rate obtained if data having a predetermined size that contains sectors used for storing the infrequently-rewritten data is written to the first memory is equal to or higher than a second rate, which is lower than the first rate, may further include an address managing section and a high utilization rate address information memory. The address managing section is configured to manage the first and second memories by using a logical address consisting of a page address, which indicates a page containing data, and a sector address, which indicates a sector used for storing the data contained in the page. The high utilization rate address information memory is configured to store a logical address of writing data that renders the data utilization rate to be equal to or higher than the first rate. The data transfer controller may be configured to determine that the writing data being input is the infrequently-rewritten data when the number of logical addresses of the writing data being input stored in the high utilization rate address information memory is less than a predetermined number.

The memory controller, which executes the data transfer control when the data utilization rate obtained if the data having the predetermined size that contains sectors used for storing the infrequently-rewritten data is written to the first memory is equal to or higher than a second rate, which is lower than the first rate, may further include a page address memory. The page address memory is configured to store, with the empty space in the second memory being less than the predetermined amount, a page address of a page containing the infrequently-rewritten data when the data stored in the second memory is the infrequently-rewritten data and the data utilization rate obtained if the infrequently-rewritten data is written to the first memory is equal to or higher than the second rate. The data transfer controller may be configured to execute, with the empty space in the second memory being less than the predetermined amount, the data transfer control for data in the second memory corresponding to the page address stored in the page address memory, at least on necessary conditions that the data stored in the second memory is the infrequently-rewritten data, the data utilization rate obtained if the infrequently-rewritten data is written to the first memory is equal to or higher than the second rate, and the number of page addresses stored in the page address memory is equal to or greater than a predetermined number. This configuration prevents the data stored in the second memory from being frequently read to be written to the first memory. In this case, the data transfer controller is configured, with the empty space in the second memory being less than the predetermined amount, after determining, for plurality of pages greater in number than the predetermined number, whether the data stored in the second memory is the infrequently-rewritten data and whether the data utilization rate obtained if the infrequently-rewritten data is written to the first memory is equal to or higher than the second rate, to decrease the second rate when the number of page addresses stored in the page address memory is less than the predetermined number, maintain a value of the second rate, without making any change to the value, when the number of the page addresses stored in the page address memory is the predetermined number, and increase the second rate when the number of page addresses stored in the page address memory is greater than the predetermined number.

In the memory controller, which executes the data transfer control when the data utilization rate obtained if the data having the predetermined size that contains sectors used for storing the infrequently-rewritten data is written to the first memory is equal to or higher than a second rate, which is lower than the first rate, the writing controller and the data transfer controller may be configured to calculate the data utilization rate by referring to utilization sector information, which indicates whether each sector stores data, and a sector used for storing writing data being input.

In the memory controller, in storing the writing data being input in the second memory, the controller may be configured, when data corresponding to the logical address of the writing data being input is already stored in a storage area of the first memory, to read the data stored in the first memory on the page basis, to rewrite a sector among sectors of the data being read, to which the writing data is to be written, and then to store the writing data being input in the second memory on the page basis.

In the memory controller, the storage area having the predetermined size may be an area in which a page containing sectors used by the writing data is stored.

Our data storage device includes: the memory controller embodied in either one of the above-described forms; a first memory; and a second memory. Specifically, the memory controller basically controls a first memory and a second memory, the first memory being configured as a non-volatile memory to which data is written by writing operation in which data is read on a page basis consisting of a plurality of sectors, a sector corresponding to writing data among the data being read is overwritten by the writing data, and then data is written on the page basis, and the second memory being configured as a non-volatile random access memory that allows faster data writing than the first memory. The memory controller comprises: a writing controller configured to control the first and second memories, upon input of the writing data and a writing request signal requesting writing of the writing data, such that the writing data being input is written to the first memory by the writing operation when a data utilization rate obtained if the writing data is written to the first memory is equal to or higher than a first rate, wherein the data utilization rate indicates a rate of a sector size used for storing the writing data based on a storage area having a predetermined size, and such that the writing data being input is stored in the second memory when the data utilization rate is lower than the first rate; and a data transfer controller configured to execute data transfer control that controls the first and second memories, with an empty space in the second memory being less than a predetermined amount, such that, at least on a necessary condition that data stored in the second memory is infrequently-rewritten data with a low rewritten frequency, the infrequently-rewritten data is read from the second memory to be written to the first memory by the writing operation.

The data storage device, which includes the memory controller embodied in either one of the above-described forms, provides advantageous effects similar to those provided by the memory controller. Examples of such effects include reduction of deterioration in the non-volatile memory and data writing at higher speed.

Our memory control method controls a first memory and a second memory, wherein the first memory is configured as a non-volatile memory to which data is written by wiring operation in which data is read on a page basis consisting of a plurality of sectors, a sector corresponding to writing data among the data being read is overwritten by the writing data, and then data is written on the page basis, and the second memory is configured as a non-volatile random access memory that allows faster data writing than the first memory.

The memory control method includes the steps of: controlling the first and second memories, upon input of writing data and a writing request signal requesting writing of the writing data, such that the writing data being input is written to the first memory by the writing operation when a data utilization rate obtained if the writing data is written to the first memory is equal to or higher than a first rate, wherein the data utilization rate indicates a rate of a sector size used for storing the writing data based on a storage area having a predetermined size, and such that the writing data being input is stored in the second memory when the data utilization rate is lower than the first rate; and executing data transfer control for controlling the first and second memories, with an empty space in the second memory being less than a predetermined amount, such that, at least on a necessary condition that the data stored in the second memory is infrequently-rewritten data with a low rewritten frequency, the infrequently-rewritten data is read from the second memory to be written to the first memory by the writing operation.

The memory controlling method is configured to control the first and second memories, upon input of writing data and a writing request signal requesting the writing of the writing data, such that the writing data being input is written to the first memory by writing operation when the data utilization rate obtained if the writing data is written to the first memory is equal to or higher than a first rate, wherein the data utilization rate indicates a rate of a sector size used for storing the writing data based on a storage area having a predetermined size, and such that the writing data being input is stored in the second memory when the data utilization rate is lower than the first rate. In the data writing operation to the first memory, data is read on the page basis consisting of a plurality of sectors, a sector corresponding to writing data among the data being read is overwritten by the writing data; and then data is written on the page basis. Accordingly, in the data writing operation to the first memory, reading and writing are performed also on sectors that are not used for data storage. Non-volatile memories are deteriorated by execution of writing operation. It is thus desired that writing be not performed on such sectors not being used for data storage. To achieve this, the first and second memories are controlled such that the writing data being input is stored in the second memory when the data utilization rate is lower than the first rate. This allows the data utilization rate in the first memory to be equal to or higher than the first rate and thus reduces reading/writing from/to the storage area in the first memory not being used for data storage. In this manner, deterioration of the first memory can be reduced. With the data being written to the second memory as above, the empty space in the second memory is reduced. Since the second memory allows faster data writing than the first memory, such a less empty space in the second memory, which may eventually inhibit writing to the second memory, reduces the data writing speed. Moreover, if the second memory contains large amounts of infrequently-rewritten data, which is data with a low rewritten frequency, the data writing speed will further be reduced. To prevent this, the second and first memories are controlled, with the empty space in the second memory being less than the predetermined amount, such that when the data stored in the second memory is the infrequently-rewritten data with a low rewritten frequency, the infrequently-rewritten data is read from the second memory to be written to the first memory by the writing operation. This prevents the empty space in the second memory from being reduced to less than the predetermined amount, which reduces deterioration of the first memory. In this manner, deterioration of non-volatile memory is reduced and faster data writing is achieved. In this regard, the "predetermined size" refers, for example, to a size determined in advance as a page size, a size of multiple pages, or a size larger than the size of one sector in the page corresponding to the logical address of the writing data. The "first memory" includes a NAND flash memory, and the "second memory" includes a resistance random access memory.

In the memory control method, the data transfer control may be executed, with the empty space in the second memory being less than the predetermined amount, at least on necessary conditions that the data stored in the second memory is the infrequently-rewritten data and the data utilization rate obtained if the data having the predetermined size that contains sectors used for storing the infrequently-rewritten data is written to the first memory is equal to or higher than a second rate, which is lower than the first rate. This prevents the data that renders the data utilization rate to be lower than the second rate from being stored in the first memory, which reduces deterioration of the first memory.

DETAILED DESCRIPTION

In the following, embodiments for implementing our products and methods will be described with reference to examples.

Figure 1:
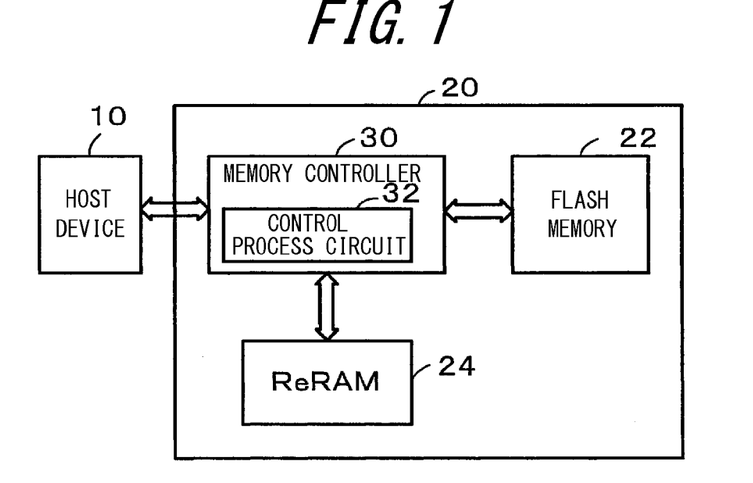
FIG. 1 is a schematic diagram of an SSD 20, provided as one example of our data storage devices, that stores data from a host device 10.

FIG. 1 is a schematic diagram of a solid state drive (SSD) 20, provided as an example of our data storage devices, that stores data from a host device 10, such as a personal computer and the like. The SSD 20 is configured as a high-capacity data storage device that stores various application programs and various kinds of data. The SSD 20 includes a flash memory 22 configured as a NAND flash memory, a resistance random access memory (ReRAM) 24, and a memory controller 30 that controls the flash memory 22 and the ReRAM 24.

The flash memory 22 is configured as a NAND flash memory that includes a flash memory cell array (not shown) having a plurality of flash memory cells. Threshold voltages of the flash memory cells vary with electron injection/extraction to/from a floating gate. The flash memory 22 may further include a low decoder, a column decoder, and a sense amplifier (none of them is shown) other than the flash memory cell array. In the flash memory 22, data is written/read on a page basis (4 kilobytes in the Example) consisting of eight sectors (512 bytes in the Example), and data is erased on a block basis (512 kilobytes in the example) consisting of 128 pages. In such a flash memory 22, data writing is performed by writing operation in which data stored in the flash memory 22 is read, data in the sectors corresponding writing data among the data being read is overwritten on the sector basis and rewritten as data, and then the data rewritten on the page basis is written to the flash memory 22. In one example, the writing/reading speed of data to/from the flash memory 22 may be set at 212 MB/s.

Figure 2:
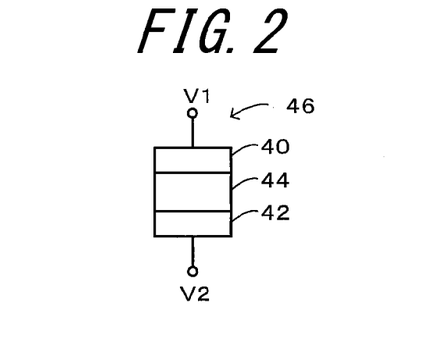
FIG. 2 is an illustration diagram of one example of a resistance variable element 46.

The ReRAM 24 includes a ReRAM cell array (not shown) comprising a plurality of ReRAM cells composed of a resistance variable element 46 illustrated in FIG. 2, and a metal oxide semiconductor (MOS) transistor (not shown) connected to the resistance variable element 46. The resistance variable element 46 is formed with a top electrode 40 and a bottom electrode 42 separated by a metallic oxide 44. The top and bottom electrodes are both made of a metal such as titan (Ti) or platinum (Pt). The ReRAM 24 may further include a low decoder, a column decoder, a sense amplifier, and the like (none of them is shown) other than the ReRAM cell array. The ReRAM cells are formed as elements that allow bipolar operation, in which the ReRAM cells are set (or have low resistance) when voltage V1 applied to the top electrode 40 is higher than voltage V2 applied to the bottom electrode 42, and are reset (or have high resistance) when the voltage V1 is lower than the voltage V2. Such a ReRAM cell, which allows bipolar operation, generally works on a relatively fast operation speed and less power consumption. The ReRAM 24 is thus configured as a memory with relatively fast working speed and less power consumption. The metallic oxide 44 may desirably be a titan oxide (TiOx), a nickel oxide (NiOx), a copper oxide (CuOx), hafnium oxide (HfOx), or the like, or may desirably be a stack of multiple layers made of such metallic oxides. In such a ReRAM 24, data writing is performed by writing data to a sector corresponding to writing data. In one example, data writing/reading speed in the ReRAM 24 may be set at 1.25 GB/s, which is faster than the data writing/reading speed in the flash memory 22.

The memory controller 30 includes a control process circuit 32 configured as a logic circuit having a plurality of logical elements. The control processing circuit 32 executes various kinds of controls and arithmetic processes. The control process circuit 32 receives various kinds of control signals or data from the host device 10. The control process circuit 32 basically controls the flash memory 22 and the ReRAM 24, in accordance with the control signals input to the control processing circuit 32, such that data can be stored/read in/from the flash memory 22 or the ReRAM 24, and outputs the data being read to the host device 10. The control process circuit 32 converts a logical address, which includes a logical page address that virtually indicates the page on which data is to be stored and a logical sector address that virtually indicates a sector in which data is to be stored upon data writing/reading, into a physical address that indicates the actual location in the flash memory 22 and the ReRAM 24; and monitors an empty space Semp 2 in the ReRAM 24. The memory controller 30 exchanges various control signals or data with the host device 10 at relatively high speed (for example at on the order of 1.25 GB/s).

Figure 3:
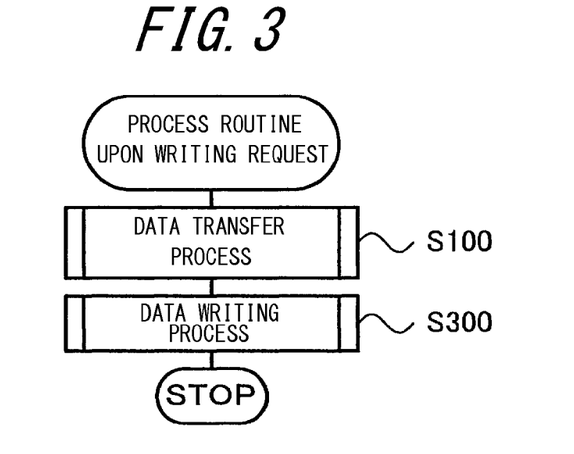
FIG. 3 is a flowchart of one example of a process routine executed by a control process circuit 32 in a memory controller 30 upon receipt of a writing request.

The following describes the operation of the SSD 20 configured as above, particularly the operation performed when data input from the host device 10 is stored in the flash memory 22 or in the ReRAM 24. FIG. 3 is a flowchart of one example of a process routine executed by the control process circuit 32 in memory controller 30 upon receipt of a writing request. This routine is executed when the following items are input: a writing request signal requesting writing of the data from the host device 10 to the flash memory 22 or to the ReRAM 24, writing data, and the logical address including the logical page address and the logical sector address that indicates the location at which the writing data is to be stored.

Upon input of the writing request signal, the control process circuit 32 in the memory controller 30 executes a data transfer process (step S100), which will be described later, and a data writing process (step S300). For the purpose of explanation, the data writing process is described first, and then the data transfer process is described.

Figure 4:
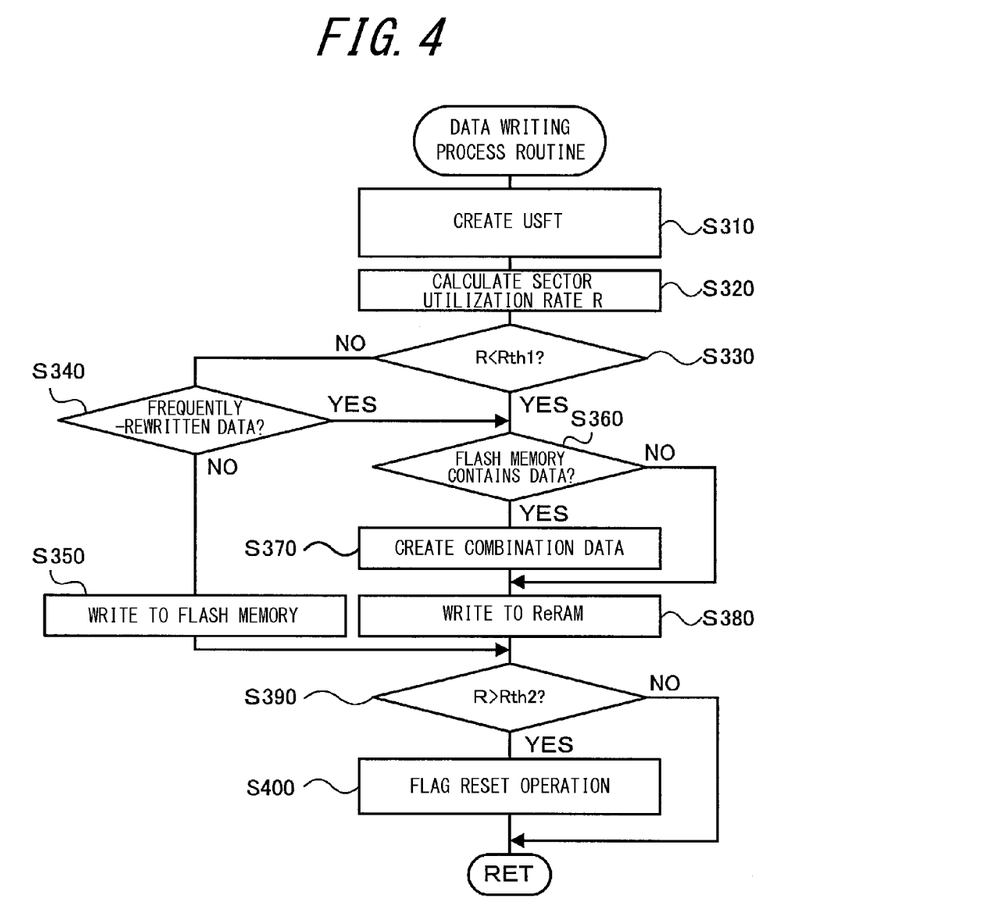
FIG. 4 is a flowchart of one example of a writing process routine executed by the control process circuit 32 in the memory controller 30.

FIG. 4 is a flowchart of one example of a writing process routine executed by the control process circuit 32 in the memory controller 30. Upon execution of the routine, the control process circuit 32 in the memory controller 30 creates a used sector flag table (USFT) (step S310), and calculates a page utilization rate R for each logical page address by using the USFT (step S320). The page utilization rate R indicates the rate of a sector used for data storage.

Figure 5:
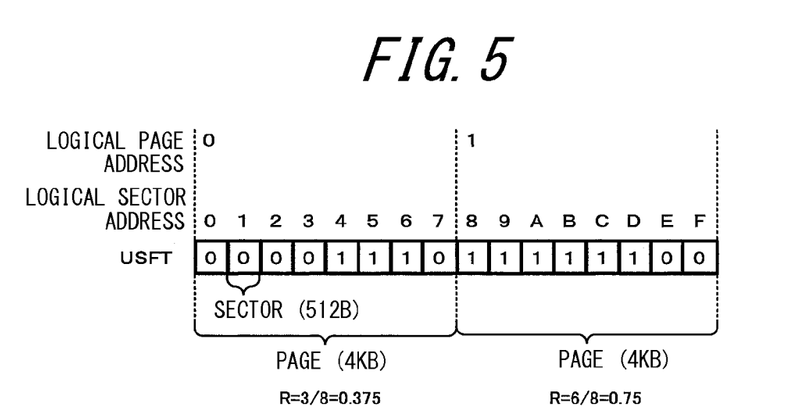
FIG. 5 is an illustration diagram of one example of a used sector flag table (USFT) and a page utilization rate R.

FIG. 5 is an illustration diagram of one example of the USFT and the page utilization rate R. The USFT has a flag for each sector. The sectors not being used for data storage indicate a value "0" and sectors being used for data storage indicate a value "1" in their flags. In the example, there are eight sectors in one page, which means that each page includes eight flags. The page utilization rate R is calculated by dividing the number of flags indicating value "1" contained in one page by the value 8 which is the total number of flags contained in one page. Therefore, when one page includes three flags, i.e., when three sectors are used in one page for data storage, the page utilization rate R is 0.375 (equals 3/8), and when one page includes six flags, i.e., when six sectors are used in one page for data storage, the page utilization rate R is 0.75 (equals 6/8).

Figure 6:
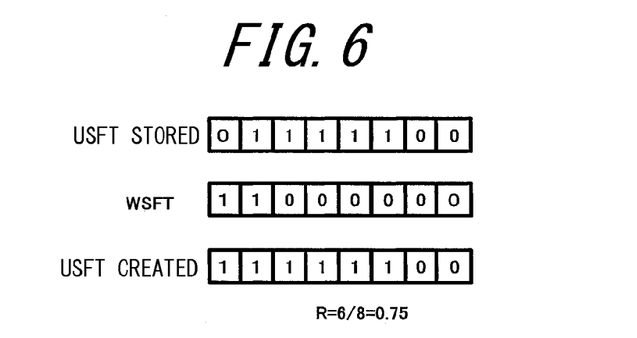
FIG. 6 is an illustration diagram of creation of the USFT.

The USFT is created by calculating a logical add (OR) of a writing data sector flag table (WSFT) and the USFT that has been already stored (step 310). In the WSFT, sectors being used for storing writing data indicate a value "1" in their flags, and the other sectors indicate a value "0" in their flags. For example, as shown in FIG. 6, when the already-stored USFT indicates "01111100" and the WSFT indicate "11000000", a USFT indicating "11111100" is created. In this case, the page utilization rate R is 0.75.

After calculating the page utilization rate R as above, the process proceeds to the steps of determining whether the page utilization rate R is equal to or higher than a threshold Rth1 (step S330) and determining whether the writing data is frequently-rewritten data with relatively high rewritten frequency (step S340). In this example, the threshold value Rth1 is set so that it decreases as the size of the data stored in the ReRAM 24 increases. To determine whether the writing data is the frequently-rewritten data, 2,000 of most-recently input logical addresses with the page utilization rate R being equal to or higher than the threshold Rth1 are stored in a storage table. The writing data is determined to be the frequently-rewritten data when more than a predetermined number (for example 100) of logical addresses of the writing data are found in the storage table.

When the page utilization rate R is equal to or higher than the threshold Rth1 but the writing data is not the frequently-rewritten data (step S330, S340), the writing data is controlled so that it is stored in the flash memory 22 by the above-described writing operation (step S350). In this manner, the data may be stored in the flash memory 22.

Figure 7:
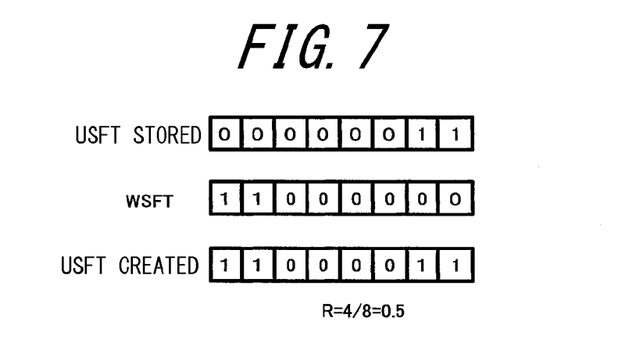
FIG. 7 is an illustration diagram of creation of another USFT.

When the page utilization rate R is lower than the threshold Rth1, i.e., when there are relatively a larger number of sectors not being used in a page as illustrated in FIG. 7 (step S330), or when the page utilization rate R is equal to or higher than the threshold Rth1 but the writing data is the frequently-rewritten data (step S340), it is determined that storing the data in the flash memory 22 accelerates deterioration of the flash memory 22, and thus the data is written to the ReRAM 24 with the writing operation (steps S360 to S380). The reason why it is determined that storing the data in the flash memory 22 accelerates deterioration of the flash memory 22 when there are relatively a larger number of sectors not being used in a page is because such writing of data to the flash memory 22 can cause writing operation to be executed even on a storage area that in fact does not need to be used for data storage, which in some cases results in deterioration of the flash memory 22. To avoid this, the threshold Rth1 is set so that it decreases as the data size stored in the ReRAM 24 increases. This reduces the amount of the writing data to be stored in the ReRAM 24 when the ReRAM 24 has less empty space in its storage area, thus allowing more appropriate data storage in the ReRAM 24 even when the ReRAM 24 has a relatively small storage area.

The writing operation to the ReRAM 24 first requires checking whether the data corresponding to the logical address of the writing data is stored in the flash memory 22 (step S360). When the data is stored in the flash memory 22, the process proceeds to the step of creating combination data (step S370). The combination data is created by reading the data of the address corresponding to the logical address of the writing data from the flash memory 22 on the page basis, and overwriting the data corresponding to the writing data, among the data being read, by the writing data on the sector basis. The process then proceeds to the step of controlling the ReRAM 24 such that the combination data can be stored in the ReRAM 24 (step S380), or such that the writing data can be stored in the ReRAM 24 when the data is not stored in the flash memory 22 (step S380). As such, even when the page utilization rate R is lower than the threshold Rth1, or when the page utilization rate R is equal to or higher than the threshold Rth1 but the writing data is determined to be the frequently-rewritten data, the writing data can be stored in the ReRAM 24, and thus deterioration of the flash memory 22 is reduced. Furthermore, since the writing speed to the ReRAM 24 is faster than that to the flash memory 22, storing writing data in the ReRAM 24 as above achieves execution of faster writing operation.

After storing the writing data in the flash memory 22 or in the ReRAM 24 as above, the process proceed to the step of checking whether the page utilization rate R is higher than a predetermined threshold Rth2 (for example 0.85) (step S390). The value of threshold Rth2 is higher than that of threshold Rth1. When the page utilization rate R is higher than the threshold Rth2, flag reset operation is executed to set all of the flags of the USFT to indicate the value "0" (step S400). When the page utilization rate R is equal to or lower than the threshold Rth2, the routine is completed without making any changes to the USFT. The reason why such flag reset operation is performed will be explained below.

Figure 8:
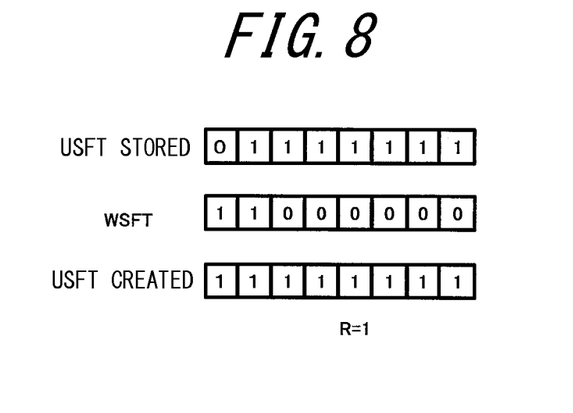
FIG. 8 is an illustration diagram of one example of the USFT created when reset operation is not executed on the USFT when the page utilization rate R is higher than a threshold Rth2.
Figure 9:
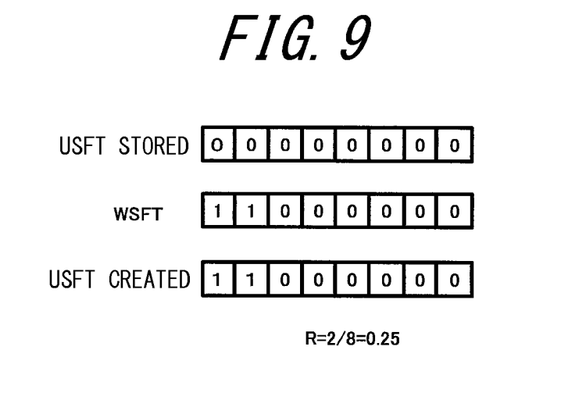
FIG. 9 is an illustration diagram of one example of the USFT created when the reset operation is executed on the USFT when the page utilization rate R is higher than the threshold Rth2.

For example, as shown in FIG. 8, when the already-stored USFT indicates "01111111" (the page utilization rate R in this case is 0.875) and the WSFT indicates "11000000", a USFT indicating "11111111" is created. With such a high page utilization rate R, the data on the corresponding page will always be stored in the flash memory 22 by the writing operation, unless the data is the frequently-rewritten data, possibly accelerating deterioration of the flash memory 22. By executing the flag reset operation, which sets all of the flags of the USFT to indicate the value "0" when the page utilization rate R is higher than the threshold Rth2 (step S400), the already-stored USFT will indicate "00000000" (the page utilization rate R in this case is zero), as illustrated in FIG. 9, when step S310 is executed next time. In this case, when the WSFT indicates "11000000", a USFT indicating "11000000" will be created. This USFT should indicate sector information used for data storage after when the page utilization rate R becomes higher than the threshold Rth2. Since the page utilization rate R in this case is 0.25, the data is to be written to the ReRAM 24 (step S330, steps S360 to S380). In this manner, data writing operation to the flash memory 22 is controlled so that deterioration of the flash memory 22 can be reduced. As above, one example of the data writing process shown in FIG. 3 has been described (step S300).

The data writing process as above may allow infrequently-rewritten data, which has a relatively low rewritten frequency with a data utilization R of lower than the threshold Rth1, to be written to the ReRAM 24, causing reduction of the empty space in the ReRAM 24 with such infrequently-rewritten data. Since the ReRAM 24 allows faster data writing than the flash memory 22, the ReRAM 24 with less empty space may reduce the data writing speed of entire SSD 20. To avoid such disadvantages, the data transfer process (step S100) is executed prior to the data writing control process (step S300) as shown in FIG. 3. The following describes a data transfer process routine.

Figure 10:
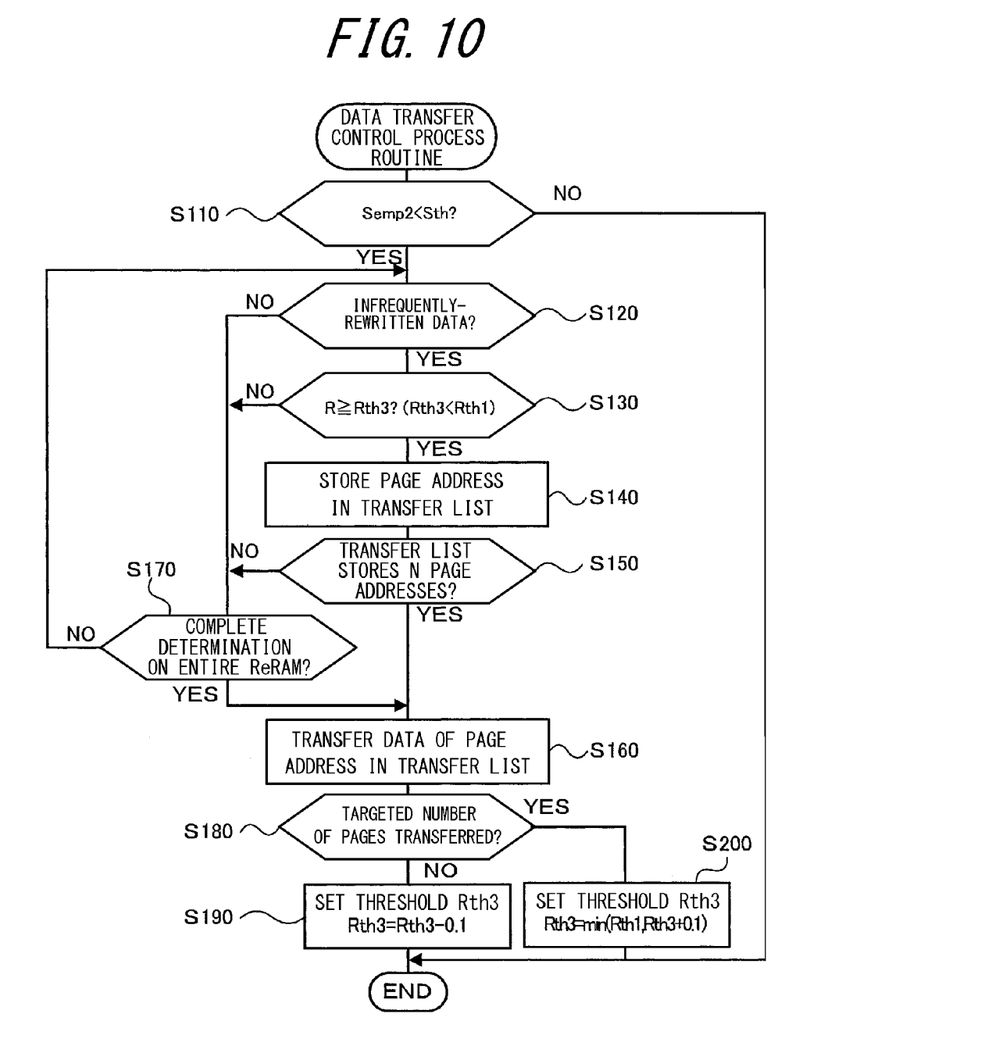
FIG. 10 is a flowchart of one example of a data transfer control process routine executed by the control process circuit 32 in the memory controller 30.

FIG. 10 is a flow chart of one example of the data transfer process routine executed by the control process circuit 32 in the memory controller 30. Once the routine is executed, the control process circuit 32 in the memory controller 30 checks the empty space Semp2 in the ReRAM 24 (step S110). When the amount of the empty space Semp2 is greater than a threshold Sth (for example 0.2), the empty space in the ReRAM 24 is determined to be sufficient. The routine is thus completed and moves to the execution of the data writing process (step S300) shown in FIG. 3.

When the empty space Semp2 is less than the threshold Sth (step S110), the empty space in the ReRAM 24 is determined to be insufficient. The process then proceeds to the step of determining whether the data stored in the sectors in the ReRAM 24 is the infrequently-rewritten data with a relatively low rewritten frequency (step S120), and/or to the step of determining whether the page utilization R is equal to or higher than a threshold Rth3, which is lower than the threshold value Rth1 (step S130). In this regard, the data is determined to be the infrequently-rewritten data when the storage table used in step S340 of FIG. 4 does not contain the logical page address including the logical sector address indicating the data on which determination is to be made in step S120.

When the data in the ReRAM 24 is the infrequently-rewritten data and the page utilization rate R obtained if the target data is written to the flash memory 22 is equal to or higher than the threshold Rth3 (steps S120 and S130), it is determined that such infrequently-rewritten data and page utilization rate R of equal to or higher than the threshold Rth3 would not cause a serious deterioration to the flash memory 22 even if the data is stored in the flash memory 22. The process thus proceeds to the step of storing the logical page address of the determination-target data obtained if stored in the flash memory 22 in a transfer list (step S140). The transfer list contains addresses of the data to be transferred to the flash memory 22.

When the data in the ReRAM 24 is not the infrequently-rewritten data (step S120) or the page utilization rata R obtained if the target data is stored in the flash memory 22 is lower than the threshold Rth3 (step S130), without storing the logical page address in the transfer list, steps S120 and S130 will be sequentially performed on the data in other sectors in the ReRAM 24 until the steps S120 and S130 are performed on the data in all the sectors in the ReRAM 24 (step S170). In this manner, only the logical page addresses of the data that does not seriously deteriorate the flash memory 22 when transferred to the flash memory 22, can be stored in the transfer list.

After storing the logical page addresses of the determination-target data obtained if written to the flash memory 22 in the transfer list (step S140), the process proceeds to the step of checking whether the number of logical page addresses stored in the transfer list has reached a threshold N, where N is a positive integer, for example 1500 (step S150). When the number of logical page addresses stored in the transfer list has not reached the threshold N, the process proceeds to the step of performing steps S120 to S150 on the data in other sectors in the ReRAM 24 until steps S120 to S150 are performed on the data in all the sectors in the ReRAM 24 (step S170). When the number of logical page addresses stored in the transfer list reaches the threshold N, the data of the logical sectors contained in the logical page addresses stored in the transfer list is read from the ReRAM 24 to be written to the flash memory 22 (step S160). The above process allows the data to be transferred to the flash memory 22 from the ReRAM 24 when the number of logical page addresses stored in the transfer list reaches the threshold N.

The reason why the data is transferred to the flash memory 22 from the ReRAM 24 when the number of logical page addresses stored in the transfer list reaches the threshold N will be explained below. Since the ReRAM 24 allows faster data writing than the flash memory 22, the ReRAM 24 with less empty space, which can inhibit data writing to the ReRAM 24, reduces the data writing speed of the entire SSD 20. Furthermore, the ReRAM 24 containing a large amount of infrequently-rewritten data with a low rewriting frequency can further reduce data writing speed. To avoid this, the data with a low rewriting frequency among the data stored in the ReRAM 24 is transferred to the flash memory 22 as above. This increases empty space in the ReRAM 24 and reduces the infrequently-rewritten data stored in the ReRAM24, enabling faster data writing to the SSD 20. Furthermore, even when the data in the ReRAM 24 is the infrequently-rewritten data and the page utilization rate R obtained if the target data is stored in the flash memory 22 is equal to or higher than the threshold Rth3, the data stored in the ReRAM 24 would not be written to the flash memory 22 until the number of logical page addresses stored in the transfer list reaches the threshold N. Therefore, data would not be frequently transferred from the ReRAM 24 to the flash memory 22, not reducing the writing speed in the SSD 20.

When S120 to S150 are performed on the data in all the sectors in the ReRAM 24 (steps S150, S170), even if the number of logical page addresses stored in the transfer list has not reached the threshold N, the process proceeds to the step of reading the data of the logical sectors contained in the logical page addresses from the ReRAM 24 and writing such data to the flash memory 22, provided that the logical page addresses are stored in the transfer list (step S160). In this manner, data can be transferred to the flash memory 22 from the ReRAM 24 even when the number of logical page addresses stored in the transfer list does not reach the threshold N.

After transferring the data from the ReRAM 24 to the flash memory 22 as above, the process proceeds to the step of determining whether the data of a target number of pages (for example 500 pages, which is the number of pages corresponding to the threshold N of the number of logical page addresses in the transfer list of step S150) has been transferred to the flash memory 22 from the ReRAM 24 (step S180). If the data of the target number of pages has not been transferred, the threshold Rth3 is determined to be higher than an appropriate value to be reset to a value that is obtained by subtracting 0.1 from the threshold Rth3 (step S190), and the routine ends. If the data of the target number of pages has been transferred, the threshold Rth3 is determined to be an appropriate value or lower than an appropriate value to be reset to either of the value obtained by adding 0.1 to the threshold Rth3 or the value threshold Rth1, whichever is lower (step S200), and the routine ends. The above process allows more appropriate setting of the threshold Rth3, and thus step S130 can be performed with more appropriate threshold Rth3 when the next time the routine is performed.

According to the SSD 20 of the above-described example, deterioration of the flash memory 22 can be reduced by storing the writing data in the ReRAM 24 when the page utilization rate R is lower than the threshold Rth1 or when the page utilization rate R is equal to or higher than the threshold Rth1 but the writing data is frequently-rewritten data. Furthermore, since the writing speed to the ReRAM 24 is faster than that to the flash memory 22, storing the writing data in the ReRAM 24 as above allows faster writing operation. Further, with the empty space Semp2 in the ReRAM 24 being less than the threshold Sth, when the data in the ReRAM 24 is the infrequently-rewritten data, and the page utilization rate R obtained if the target data is stored in the flash memory 22 is equal to or higher than the threshold Rth3, the logical page addresses of the determination-target data obtained if stored in the flash memory 22 are stored in the transfer list. When the number of logical page addresses stored in the transfer list reaches the threshold N, data of the logical sectors contained in the logical page addresses stored in the transfer list is read from the ReRAM 24 to be written to the flash memory 22. The process as such allows faster data writing to the SSD 20. Furthermore, since the data stored in the ReRAM 24 will not be written to the flash memory 22 until the number of logical page addresses stored in the transfer list reaches the threshold N, data would not be frequently transferred from the ReRAM 24 to the flash memory 22, thus reducing performance degradation in the SSD 20.

In the SSD 20 of the example, the data stored in the ReRAM 24 is not written to the flash memory 22 until the number of logical page addresses stored in the transfer list reaches the threshold N (steps S140 to S160). However, the SSD 20 may be configured such that the target data is stored in the flash memory 22 without storing page addresses in the transfer list, as long as the data in the ReRAM 24 is the infrequently-rewritten data and the page utilization rate R obtained if the target data is stored in the flash memory 22 is equal to or higher than the threshold Rth3.

In the SSD 20 of the example, the threshold Rth3 can be changed depending on whether the data is transferred in steps S180 to S200. However, the threshold Rth3 can be made as an unchanged, constant value, which does not require such a changing process.

In the SSD 20 of the example, step S140 and the steps following step S140 are performed when the data in the ReRAM 24 is the infrequently-rewritten data and the page utilization rate R obtained if the target data is stored in the flash memory 22 is equal to or higher than the threshold Rth3. However, step S140 and the steps following step S140 can be performed without determining whether the page utilization rate R obtained if the target data is stored in the flash memory 22 is equal to or higher than threshold Rth3.

In the SSD 20 of the example, even when the page utilization rate R is equal to or higher than the threshold Rth1, the writing data being the frequently-rewritten data will be stored in the ReRAM 24 (steps S330, S340, S360 to S380). However, the writing data can be indiscriminately stored in the flash memory 22 without performing step S340 as long as the page utilization rate R is equal to or higher than the threshold Rth1 (steps S330, S350).

In the SSD 20 of the example, the threshold Rth1 is set so that it decreases as the size of the data storage area in the ReRAM 24 increases. However, the threshold Rth1 may be set to a constant value regardless of the data storage area in the ReRAM 24.

In the SSD 20 of the example, the flag reset operation is executed to set all of the flags of the USFT to indicate the value "0" when the page utilization rate R is higher than the threshold Rth2 (steps S390, S400). However, this process may not be necessarily executed.

In the SSD 20 of the example, the page utilization rate R is calculated on a page basis, or specifically, is calculated by dividing the number of flags indicating the value "1" contained in a page by the value "8" which is the total number of flags contained in one page. However, the page utilization rate R can be calculated on any size basis as long as it is larger than the size of one sector. For example, the page utilization rate R can be calculated on a basis of two or more pages, or specifically, can be calculated by dividing the number of flags indicating the value "1" contained in the two or more pages by the total number of flags contained in the two or more pages.

The SSD 20 of the example includes the flash memory 22. However, the SSD 20 can include, in place of the flash memory 22, any non-volatile memory that is configured to allow data writing operation in which data stored in the storage area is read on a page basis consisting of a plurality of sectors, the data being read is rewritten on a sector basis, and then data is written on the page basis.

In the SSD 20 of the example, the ReRAM cells in the ReRAM 24 are formed as elements that allow bipolar operation. However, the ReRAM cells can be composed of the resistance variable elements 46 and diodes (not shown), and can be configured as elements that allow unipolar operation, in which the ReRAM cells are set (or have low resistance) when a voltage higher than a voltage V2 is applied to a voltage V1, and are reset (or have high resistance) when a voltage higher than the voltage V2 and lower than the voltage that sets the ReRAM cells is applied to the voltage V1. Such ReRAM cells allowing the unipolar operation typically have simple cell configuration and small cell size compared with the cell configuration and the cell size of the ReRAM cells allowing bipolar operation. Therefore, a ReRAM including ReRAM cells that allow unipolar operation may occupy small area compared with a ReRAM including ReRAM cells that allow bipolar operation, although operation speed of the ReRAM including ReRAM cells that allow unipolar operation may be slightly decreased.

The SSD 20 of the example includes the ReRAM 24. However, the SSD 20 may include other kinds of non-volatile random access memory, in place of the ReRAM 24, that allows faster data writing than the flash memory 22. Examples of such a non-volatile random access memory include, but not limited to, a ferroelectric random access memory having a capacitor formed with a ferroelectric material sandwiched between two electrode, a magnetoresistive random access memory having a magnetic tunnel junction element with the structure of a tunnel magnetoresistive film sandwiched between magnetic films, and a phase-change memory having an element formed with a phase-change material sandwiched between two electrodes.

In the example, for illustration purpose, this disclosure is used in a SSD. However, the disclosure can be used in any device, for example in a USB flash drive, as long as the device is for data processing. Further, the memory controller 30, the flash memory 22, and the ReRAM 24 may not be contained in the same device. They each may be contained in a different device. For example, the flash memory 22 and the ReRAM 24 may be contained in the same device while the memory controller 30 is contained in a different device. In addition, it is possible to provide one form of memory control method that controls such flash memory 22 and the ReRAM 24.

Correspondence between the main elements appearing in the example and the main elements described in the summary section will be described. In the example, for the memory controller, the control process circuit 32 that executes the data writing process routine illustrated in FIG. 4 corresponds to the "writing controller" and the control process circuit 32 that executes the data transfer control process routine illustrated in FIG. 10 corresponds to the "data transfer controller". In the memory controller, the control process circuit 32 that controls the flash memory 22 and the ReRAM 24 by using the logical address corresponds to the "address controller", the control process circuit 32 that stores the most-recently input logical addresses having the page utilization rate R of equal to or higher than the threshold Rth1 corresponds to the "high utilization rate address information memory", and the control process circuit 32 that stores the page addresses in step S140 of the process routine illustrated in FIG. 10 corresponds to the "page address memory". For the data storage device, the memory controller 30 corresponds to the "memory controller", the flash memory 22 corresponds to the "first memory", and the ReRAM 24 corresponds to the "second memory".

Embodiments for practicing our products and methods have been described with reference to the example; however, it will be appreciated that our products and methods are not limited to such examples, but can be practiced in various forms without departing from the sprit and scope of the disclosure.

INDUSTRIAL APPLICABILITY

Our products and methods can be used in the industry of manufacturing memory controllers, data storage devices, and the like.

REFERENCE SIGNS LIST

10 Host device
20 SSD
22 Flash memory
24 ReRAM
30 Memory controller
32 control process circuit
40 Top electrode
42 Bottom electrode
44 Metallic oxide
46 Resistance variable element

The invention claimed is:

1. A memory controller for controlling a first memory and a second memory, the first memory being configured as a non-volatile memory to which data is written by writing operation in which data is read on a page basis consisting of a plurality of sectors, a sector corresponding to writing data among the data being read is overwritten by the writing data, and then data is written on the page basis, and the second memory being configured as a non-volatile random access memory that allows faster data writing than the first memory, the memory controller comprising:
   a writing controller configured to control the first and second memories, upon input of the writing data and a writing request signal requesting writing of the writing data, such that the writing data being input is written to the first memory by the writing operation when a data utilization rate obtained if the writing data is written to the first memory is equal to or higher than a first rate, wherein the data utilization rate indicates a rate of a sector size used for storing the writing data based on a storage area having a predetermined size; and such that the writing data being input is stored in the second memory when the data utilization rate is lower than the first rate; and
   a data transfer controller configured to execute data transfer control that controls the first and second memories, with an empty space in the second memory being less than a predetermined amount, such that, at least on a necessary condition that data stored in the second memory is infrequently-rewritten data with a low rewritten frequency, the infrequently-rewritten data is read from the second memory to be written to the first memory by the writing operation,
   wherein the data transfer controller is configured to execute the data transfer control, with the empty space in the second memory being less than the predetermined amount, at least on necessary conditions that the data stored in the second memory is the infrequently-rewritten data and the data utilization rate obtained if the infrequently-rewritten data is written to the first memory is equal to or higher than a second rate, the second rate being lower the first rate.

2. The memory controller of claim 1, further comprising:
   an address managing section configured to manage the first and second memories by using a logical address consisting of a page address indicating a page containing data and a sector address indicating a sector used for storage of the data contained in the page; and
   a high utilization rate address information memory configured to store the logical address of writing data that renders the data utilization rate to be equal to or higher than the first rate,
   wherein the data transfer controller is configured to determine that the writing data being input is the infrequently-rewritten data when the number of logical addresses of the writing data being input stored in the high utilization rate address information memory is less than a predetermined number.

3. The memory controller of claim 2, wherein
   in storing the writing data being input in the second memory, the controller is configured, when data corresponding to the logical address of the writing data being input is already stored in a storage area of the first memory, to read the data stored in the first memory on the page basis, to rewrite a sector to which the writing data is to be written among sectors of the data being read, and then to store the writing data being input in the second memory on the page basis.

4. The memory controller of claim 1, further comprising:
   a page address memory configured to store, with the empty space in the second memory being less than the predetermined amount, a page address of a page containing the infrequently-rewritten data when the data stored in the second memory is the infrequently-rewritten data and the data utilization rate obtained if the infrequently-rewritten data is written to the first memory is equal to or higher than the second rate, wherein the data transfer controller is configured to execute, with the empty space in the second memory being less than the predetermined amount, the data transfer control for data in the second memory corresponding to the page addresses stored in the page address memory, at least on necessary conditions that the data stored in the second memory is the infrequently-rewritten data, the data utilization rate obtained if the infrequently-rewritten data is written to the first memory is equal to or higher than the second rate, and the number of page addresses stored in the page address memory is equal to or greater than a predetermined number.

5. The memory controller of claim 4, wherein the data transfer controller is configured, with the empty space in the second memory being less than the predetermined amount, after determining, for a plurality of pages greater in number than the predetermined number, whether the data stored in the second memory is the infrequently-rewritten data and whether the page utilization rate obtained if the infrequently-rewritten data is written to the first memory is equal to or higher than the second rate, to decrease the second rate when the number of page addresses stored in the page address memory is less than the predetermined number, maintain a value of the second rate, without making any change to the value, when the number of page addresses stored in the page address memory is the predetermined number, and increase the second rate when the number of page addresses stored in the page address memory is greater than the predetermined number.

6. The memory controller of claim 1, wherein the writing controller and the data transfer controller are configured to calculate the data utilization rate by referring to utilization sector information, which indicates whether each sector stores data, and a sector used for storing the writing data being input.

7. The memory controller of claim 1, wherein the storage area having the predetermined size is an area in which pages containing sectors used by the writing data is stored.

8. The memory controller of claim 1, wherein the first memory is a NAND flash memory.

9. The memory controller of claim 1, wherein the second memory is a resistance random access memory.

10. A data storage device, comprising: the memory controller, the first memory, and the second memory of claim 1.

11. A memory control method for controlling a first memory and a second memory, wherein the first memory is configured as a non-volatile memory to which data is written by writing operation in which data is read on a page basis consisting of a plurality of sectors, a sector corresponding to writing data among the data being read is overwritten by the writing data, and then data is written on the page basis, and the second memory is configured as a non-volatile random access memory that allows faster data writing than the first memory, the method comprising the steps of:

controlling the first and second memories, upon input of the writing data and a writing request signal requesting writing of the writing data, such that the writing data being input is written to the first memory by the writing operation when a data utilization rate obtained if the writing data is written to the first memory is equal to or higher than a first rate, wherein the data utilization rate indicates a rate of a sector size used for storing the writing data based on a storage area having a predetermined size, and such that the writing data being input is stored in the second memory when the data utilization rate is lower than the first rate; and executing data transfer control for controlling the first and second memories, with an empty space in the second memory being less than a predetermined amount, such that, at least on a necessary condition that data stored in the second memory is infrequently-rewritten data with a low rewritten frequency, the infrequently-rewritten data is read from the second memory to be written to the first memory by the writing operation, wherein the data transfer control is executed, with the empty space in the second memory being less than the predetermined amount, at least on necessary conditions that the data stored in the second memory is the infrequently-rewritten data and the data utilization rate obtained if the data having the predetermined size that contains sectors used for storing the infrequently-rewritten data is written to the first memory is equal to or higher than a second rate, the second rate being lower than the first rate.

* * * * *